US009858129B2

(12) United States Patent
Lin et al.

(10) Patent No.: US 9,858,129 B2
(45) Date of Patent: Jan. 2, 2018

(54) DYNAMIC COPY CONTENT RETRIEVAL

(71) Applicant: International Business Machines Corporation, Armonk, NY (US)

(72) Inventors: Yu-Chun Lin, Taipei (TW); Joey H. Y. Tseng, Taipei (TW); Yu-Hsing Wu, Taipei (TW); Hsieh-Lung Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/044,155

(22) Filed: Feb. 16, 2016

(65) Prior Publication Data
US 2017/0235618 A1  Aug. 17, 2017

(51) Int. Cl.
*G06F 3/00*  (2006.01)
*G06F 9/54*  (2006.01)

(52) U.S. Cl.
CPC .............. *G06F 9/543* (2013.01); *G06F 9/546* (2013.01)

(58) Field of Classification Search
CPC .................................... G06F 9/54; G05F 9/54
USPC .......................................................... 719/310
See application file for complete search history.

(56) References Cited

U.S. PATENT DOCUMENTS

| 7,631,268 | B2 | 12/2009 | McGowan et al. |
| 7,950,066 | B1* | 5/2011 | Zuili ................... G06F 21/6281 713/165 |
| 8,429,551 | B2 | 4/2013 | Kim et al. |
| 8,595,230 | B1 | 11/2013 | Djabarov |
| 8,631,337 | B2 | 1/2014 | Arokiaswamy |
| 9,336,326 | B2* | 5/2016 | Abbott ................ G06F 3/04842 |
| 2005/0172241 | A1 | 8/2005 | Daniels et al. |
| 2007/0185837 | A1* | 8/2007 | Gurcan ............... G06F 17/2247 |
| 2011/0099380 | A1* | 4/2011 | Vandewater .......... H04L 63/102 713/176 |
| 2011/0125970 | A1 | 5/2011 | Commarford et al. |
| 2012/0159334 | A1 | 6/2012 | Messerly et al. |
| 2013/0268850 | A1* | 10/2013 | Kyprianou .............. G06F 17/24 715/255 |
| 2014/0188802 | A1* | 7/2014 | Branton .................. G06F 9/543 707/634 |

(Continued)

FOREIGN PATENT DOCUMENTS

WO   0106416 A2   1/2001

OTHER PUBLICATIONS

Zhenmin Li, CP-Miner: Finding Copy-Paste and Related Bugs in Large-Scale Software code, Mar. 2006.*

(Continued)

*Primary Examiner* — Lechi Truong
(74) *Attorney, Agent, or Firm* — Walter L. Rudberg; A. Imtiaz Billah

(57) ABSTRACT

Embodiments of the present invention provide a method and system for a dynamic copy-and-paste operation on a graphical user interface. Initially, a first application having a set of content to copy is identified. An indication to copy a subset of content from the first application to a second application is received. The second application has a predefined category. A communication channel is established between the first and second applications. A portion of content to copy from the first application to the second application is determined. Finally, the copied content is displayed on the second application graphical user interface.

20 Claims, 4 Drawing Sheets

(56) References Cited

U.S. PATENT DOCUMENTS

2015/0215570 A1* 7/2015 Leibow ............... G06F 3/1454
386/231

OTHER PUBLICATIONS

Deville, "Interprocess communication on iOS with Berkeley sockets", Feb. 8, 2015, 17 pages, <http://ddeville.me/2015/02/interprocess-communication-on-ios-with-berkeley-sockets/>.

Jindal et al., "Destination aware automatic content selection at the source while doing copy/paste operations", An IP.com Prior Art Database Technical Disclosure, IP.com No. 000224398, Dec. 18, 2012, 9 pages.

"Inter-process communication", Wikipedia, the free encyclopedia, last modified Nov. 11, 2015, 4 pages, <https://en.wikipedia.org/wiki/Inter-process_communication>.

* cited by examiner

DYNAMIC COPY CONTENT RETRIEVAL

BACKGROUND OF THE INVENTION

The present invention relates generally to the field of user interface functions, and more particularly to copy and paste operations on a computing device.

Advances in technology are leading towards the miniaturization of commonly used devices. Computing devices, for instance, have benefited from recent advancements in microprocessor design, providing increasingly complex computations while decreasing the size of respective components of the device.

Electronic devices such as smart phones, and personal computers, and the like, may provide a graphical user interface that allows users to easily interact with the various functionalities of the electronic device. Many graphical user interfaces provide a copy and paste function, which allows a user to reproduce content of interest from a source location and copy it to a target location. Generally, copy and paste functions are commands that offer a user an interface technique for transferring data between two locations. Copy and paste functions provide capabilities to replicate information with ease between two separate applications.

SUMMARY

According to one embodiment of the present invention, a method for dynamic copy content retrieval is provided, the method comprising: identifying, by one or more processors, a first application wherein the first application comprises a set of content to copy; receiving, by one or more processors, an indication to copy a subset of content from the set of content to a second application having a predefined category; responsive to receiving the indication, establishing, by one or more processors, a communication channel between the first application and the second application; determining, by one or more processors, a portion of content from the subset of content to copy to the second application based in part on the predefined category of the second application; and responsive to determining the portion of content to copy to the second application, displaying, by one or more processors, the determined portion of content on the second application.

Another embodiment of the present invention provides a computer program product for dynamic copy content retrieval, based on the method described above.

Another embodiment of the present invention provides a computer system for dynamic copy content retrieval, based on the method described above.

DETAILED DESCRIPTION

Figure 1:
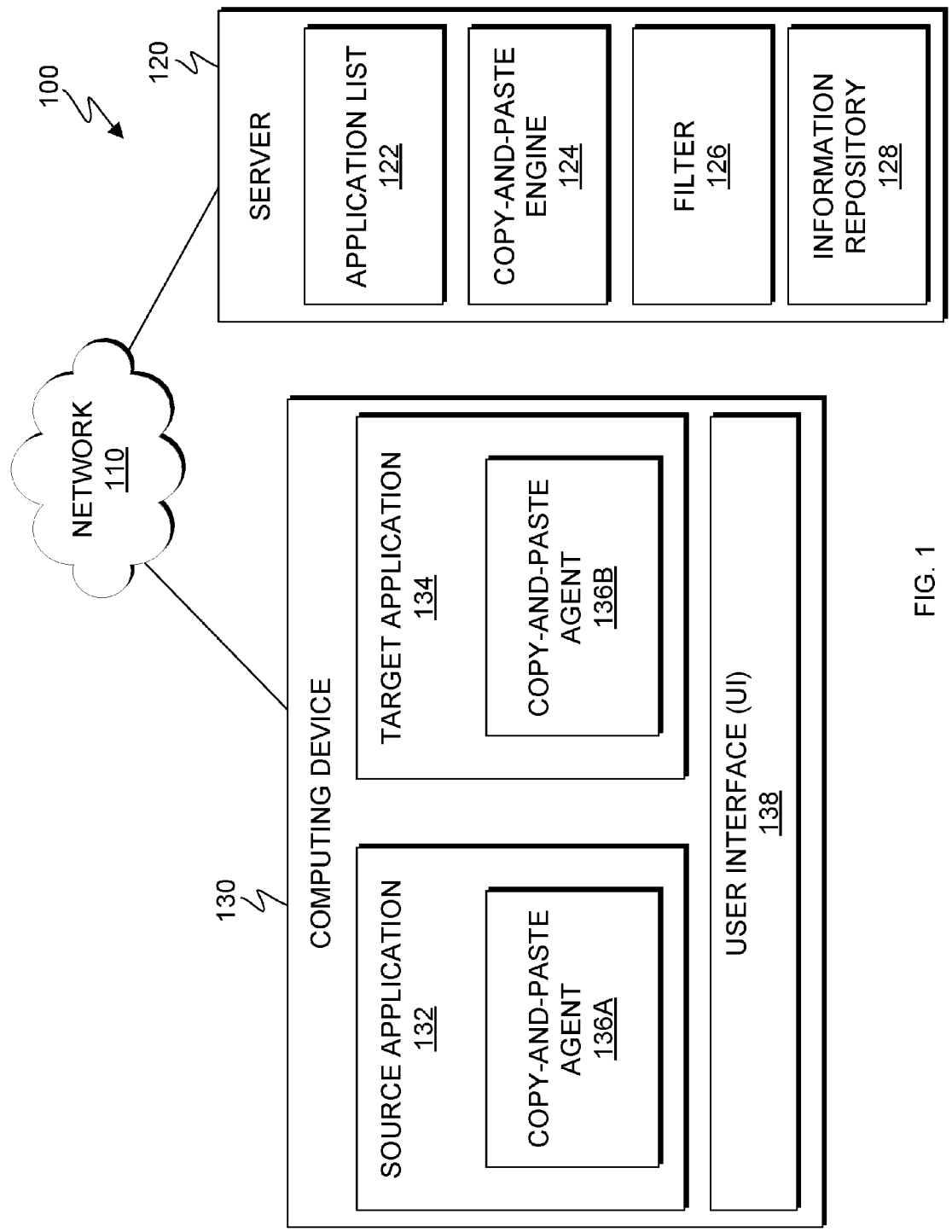
FIG. 1 is a functional block diagram illustrating a data processing environment, in accordance with an embodiment of the present invention.

Computing devices have become an essential part of daily life. For example, computing devices are used to communicate with other persons, perform various Internet searches, perform various work related tasks, play games, etc. It often is necessary to copy specific information from one application to another application on a computing device. However, due to small nature of modern computing devices, it might take extra time to copy the desired information and paste it in a second application.

Embodiments of the present invention provide systems and methods to perform a copy and paste function on a computing device, by establishing a communication channel between the two applications. The source application contains the information to be copied and the target application is the location the information is transported to. The communication channel provides a means for the target application to retrieve the relevant contents from the source application on demand. For example, the communication channel may specify the kind of data the target application needs.

Embodiments of the present invention provide systems and methods to automatically detect content to be copied from the source application. Embodiments of the present invention provide systems and methods to determine the copy content according to the selected destination application (the target application). For example, the content to be copied may be detected through various means such as user's commonly copied text. For example, the content to be copied may be detected through various means such as a database containing a pool of user's commonly copied text. In another example, the target application may automatically retrieve the user's desired information to be copied. For instance, if the target application is a map, then the target application may retrieve only addresses to be located on the map.

Embodiments of the present invention provide systems and methods to establish a communication channel between copy source and paste destinations. Additionally, embodiments of the present invention provide systems and methods to detect which data is needed by a specific destination application, then perform smart copy-paste function.

The embodiments of the present invention will be described in the context of a computing device and a corresponding user interface. Computing devices, such as mobile phones, tablet computers, laptop computers, personal computers, e-readers, or any other electronic devices having a graphical user interface (GUI) allow a user to interact with the device through various input/output (I/O) interfaces. The GUI of an electronic device is capable of representing information from the electronic device to the user. A GUI may act as user interface (e.g., icons), providing a user the ability to interact with the computing device. Additionally, the GUI, for example, can include a traditional display screen or a touch screen.

It is to be understood that while the concepts included herein are presented in the context of a computing device, the concepts disclosed herein may be applied in other contexts as well, if the appropriate hardware is available.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes server 120, and computing device 130, interconnected over network 110.

Greater or fewer components may alternatively be implemented. While FIG. 1 shows computing device 130 having various components, it is understood that implementing all of the illustrated components is not a requirement. For example, computing device 130 may include internal and external hardware components, as depicted and described in further detail with respect to FIG. 4. Data processing environment 100 may include additional computing devices, servers or other devices not shown.

Network 110 may be a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between computing device 130, and server 120, in accordance with embodiments of the invention. Network 110 may include wired, wireless or fiber optic connections.

In the exemplary embodiment, server 120 is a server computer. In other embodiments, server 120 may be a management server, a web server or any other electronic device capable of receiving and sending data. In another embodiment, server 120 may represent a server computing system utilizing multiple computers as a server system, such as in a cloud computing environment. Server 120 contains application list 122, copy-and-paste engine 124 (hereinafter 'C&P' engine), filter 126, and information repository 128.

Application list 122 represents a listing of registered applications. New applications may be registered via C&P engine 124. An application contained in application list 122 may have an application pair and/or a predefined category. An application pair is a pairing between two applications, wherein the applications are compatible to copy and paste via a communication channel. An application pair may predetermine which applications may be a target application for which source applications, and vis-versa. Applications contained within application list 122 may have a predefined category, such that the C&P engine 124 may determine the type of information to copy and paste automatically. An application category assists in determining what type of information should be selected as "to be copied" content from the source application to the target application. For example, if the target application is registered as a map, then C&P engine 124 may automatically search the source application for an address to copy into the target application.

Copy-and-paste engine 124 performs the copy and paste functions between two applications. Specifically, C&P engine 124 establishes the communication channel between source application 132 and target application 134. The two applications may be independent from one another, such as a web browser and a map application.

C&P engine 124 establishes a communication channel which acts as a link between a source application 132 and a target application 134. The communication channel allows source application 132 to send relevant content to target application 134 and/or target application 134 to retrieve the contents it needs from source application 132 dynamically and automatically for further processing based on static (e.g., predefined preference) and/or dynamic criteria (e.g., user behavior context) and display the processing result accordingly. Further, through the established communication channel, target application 134 can retrieve more relevant contents from source application 132 on demand if necessary.

Filter 126 may be utilized by C&P engine 124 to determine specific content to be copied from source application 132 to target application 134. Filter 126 may act as a sieve which filters specific content based on the predefined category of target application 134. For example, if target application 134 is a map, filter 126 may determine an address is the specific content to be copied from source application 132 to target application 134. Specifically in this example, C&P engine 124 retrieves 'content to be copied' from source application 132 (via copy-and-paste agent 136A); thereafter filter 126 will determine the most suitable information for target application 134, which is an address, as target application 134 is a map. In an alternative example, if target application 134 is a web browser, filter 126 may determine a URL address is the specific content to be copied from source application 132 to target application 134. Specifically in this example, C&P engine 124 retrieves 'content to be copied' from source application 132 (via copy-and-paste agent 136A); thereafter filter 126 will determine the most suitable information for target application 134, which is an URL address, as target application 134 is a web browser.

Filter 126 may determine the specific content to be copied from source application 132 to target application 134 by analyzing an application pair. Similarly, filter 126 may determine the specific content to be copied from source application 132 to target application 134 by analyzing the predefined category of the source and target applications.

In an exemplary embodiment, C&P engine 124 may receive an indication from target application 134, containing a request to receive the content from source application 132. C&P engine 124 then forwards the request to source application 132. In response, source application 132 sends content to C&P engine 124. Based on the predefined category of target application 134, C&P engine 124, utilizing filter 126, sends the filtered content to target application 134.

In an exemplary embodiment, content may be transferred between C&P engine 124 and a source application, whereas filtered content is transferred between C&P engine 124 and a target application. In this embodiment, the filtered content passes through filter 126.

Information repository 128 may include any suitable volatile or non-volatile computer readable storage media, and may include random access memory (RAM) and cache memory (not depicted in FIG. 1). C&P engine 124 may be stored in a persistent storage component (not depicted) for execution and/or access by one or more of processor(s) via one or more memories (for more detail refer to FIG. 4). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Information repository 128 can be implemented using any architecture known in the art such as, for example, a relational database, an object-oriented database, and/or one or more tables. Information repository 128 may store the data to be copied, the software to translate the data to be copied, and/or the software to transfer the data to be copied. Information repository 128 may contain additional information, software and/or data as necessary, identifiable by those skilled in the art. While depicted on server 120, in the exemplary embodiment, information repository 128 may be on a remote server or a "cloud" of computers interconnected by one or more networks utilizing clustered computers and components to act as a single pool of seamless resources, accessible to copy-and-paste engine 124 via network 110.

In the various embodiments of the present invention, computing device 130 may be a laptop computer, a tablet computer, a netbook computer, a personal computer (PC), a desktop computer, a personal digital assistant (PDA), a smart phone, or any programmable electronic device capable of communicating with server 120 via network 110. Computing device 130 may include internal and external hardware components, as depicted and described in further detail with respect to FIG. 4. As depicted in data processing environment 100, computing device 130 includes, source application 132, target application 134, copy-and-paste agent 136A (associated with source application 132), copy-and-paste agent 136B (associated with target application 134), and user interface 138.

Source application 132 and target application 134 are applications running on computing device 130. In an embodiment, source application 132 and target application 134 are two distinct and separate applications. In an alternative embodiment, source application 132 and target application 134 may represent two instances of the same application.

Source application 132 represents an application which the user copies data from. Target application 134 represents an application which the user copies data to. Both source application 132 and target application 134 represent applications having a user interface, similar to user interface 138.

Copy-and-paste agent 136A and 136B are similar as each are in communication with their respective application as well as with C&P engine 124. However; copy-and-paste agent 136A and 136B may have different functions depending on whether the copy-and-paste agent is on source application 132 or target application 134. Copy-and-paste agent 136A may for example, send content nearby an anchor point or within a pre-defined area to C&P engine 124 upon receiving a request from C&P engine 124 for a set of data to be copied. In another example, copy-and-paste agent 136A may detect a user's request to copy a set of data, and in response, send a set of data to be copied nearby an anchor point or within a pre-defined area to C&P engine 124, through the communication channel. In contrast, copy-and-paste agent 136B may send a request to C&P engine 124, for a set of data to be copied. Similarly, copy-and-paste agent 136B may and receive, from C&P engine 124, a filtered set of data to be copied.

Copy-and-paste agent 136A transfers the data to be copied from source application 132 to C&P engine 124. In an embodiment, copy-and-paste agent 136A receives C&P engine 124 requests to copy data from source application 132. In an embodiment, copy-and-paste agent 136A, upon a request from a user, may transmit data nearby an anchor point data to C&P engine 124. In an embodiment, copy-and-paste agent 136A, upon a request, may transmit to C&P engine 124, certain data within a predefined range.

Copy-and-paste agent 136B transfers the data to be copied from C&P engine 124 to target application 134. In an embodiment, copy-and-paste agent 136B may transmit a copy content requests to C&P engine 124. In an embodiment, copy-and-paste agent 136B may receive filtered content sent by C&P engine 124. The filtered content will be in a format which can be processed by target application 134.

In an exemplary embodiment of the present invention, source application 132 and target application 134 may be the same application running on computing device 130. In an exemplary embodiment of the present invention, source application 132 and target application 134 may be in two or more separate computing devices 130 (FIG. 1 only displays one computing device for reference only).

Embodiments of the present invention provide systems and methods to create an anchor point near the content to be copied. An anchor point, for example, is a notation which a user may manually create near the content to be copied from the source application. Upon creating the anchor point, the copy-and-paste engine may search the content near the anchor point to extract the content to be copied based on the type of target app selected by user.

User interface (UI) 138, may be, for example, a graphical user interface (GUI) or a web user interface (WUI) and can display text, documents, web browser windows, user options, application interfaces, and instructions for operation. A user interface, such as UI 138, refers to the information (such as graphic, text, and sound) a program presents to a user and the control sequences the user employs to control the program. There are many types of user interfaces that allow users to interact with electronic devices, such as a computer keyboard and mouse, through graphical icons and visual indicators, such as secondary notation, as opposed to text-based interfaces, typed command labels, or text navigation. User interface 138 is a means by which a user interacts with computing device 130. User interface 138 is capable of receiving data, user commands, and data input modifications from a user.

Figure 2:
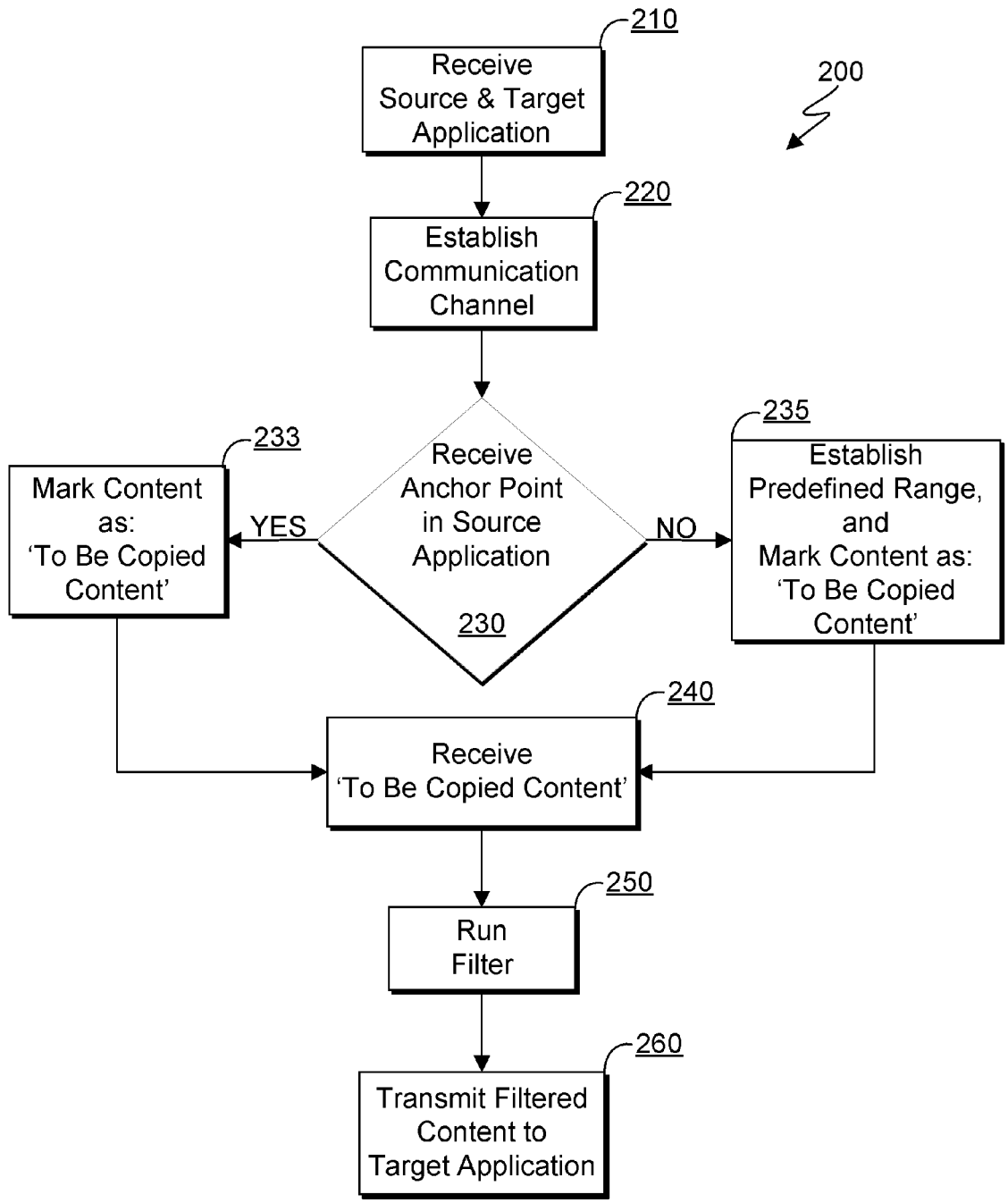
FIG. 2 is a flow chart illustrating operational steps for a copy and paste function, in accordance with an embodiment of the present invention.

Reference is now made to FIG. 2. FIG. 2 is flowchart, generally designated 200, depicting operational steps for copy and paste functions associated with C&P engine 124, in accordance with an embodiment of the present invention.

When a user opens source application 132 the user may be promoted to select target application 134. Alternatively, when the user determines the need to copy content to a new application, the user may utilize UI 138 to prompt C&P engine 124 to allow the user to select a desired target application 134. For example, copy-and-paste agent 136A may create and display on UI 138, an icon titled "select copy target" to be included in source application 132. Upon the user selecting "select copy target" icon, the user may be prompted to select a target application from application list 122. It is noted that both source application 132 and target application 134 are applications registered and listed within application list 122.

In step 210, C&P engine 124 receives source application 132 and target application 134. In an exemplary embodiment, when a user opens source application 132, C&P engine, based on application pair and/or a predefined category, may automatically determine which application in application list 122 is the ideal target application. In another exemplary embodiment, a user may open source application 132 and then select target application 134. For instance, source application 132 may display an icon, that when triggered, prompts the user to select a target application 134 in which content is copied from source application 132. The icon for example, may be a drop down window or other means known in the art. When the icon is triggered it displays to the user the application list containing all target applications 134. The application list may display only target applications which are paired with source application 132; therefore the list of target applications may change depending on a specific source application used to open application list 122. For example, application list 122 contains an application pair of a browser application and a map application. A user may set map application as target application 134 when opening a browser application, if the browser application is designated as source application 132.

It is noted that target application 134 is listed within application list 122. If, however, a desired target application is not located in application list 122, then the user may register the desired target application 134, prior to initiating the copy and paste function.

In step 220, C&P engine 124 establishes a communication channel between source application 132 and target application 134. The communication channel provides communication between the source application 132 and target application 134 via copy-and-paste agents 136A and 136B, respectively.

In decision 230, C&P engine 124 determines if an anchor point is established in source application 132. Creating an anchor point is optional. An anchor point indicates more precisely the content the user wants to copy from source application 132 to target application 134. An anchor point may be created when a user, indicates a point through UI 138 near content to be copied. For instance, if UI 138 is a touch screen GUI, a user may simply touch the display screen nearby the content the user wants to copy from source application 132.

If C&P engine 124 receives an anchor point on source application 132, then in step 233, the content located nearby the anchor point is marked as the 'to be copied content'. Alternatively, if C&P engine 124 does not receive an anchor point, then in step 235 the content located within a predefined range is used as the 'to be copied content'. The predefined range is established by a user. For example, the predefined range may be a specific number of lines in a current page. In another example, the predefined range may be a predetermined amount of memory, where the memory is allocated to store as much 'to be copied content' as possible. In another example, the predefined range may be a specific type of information based on the type of source application 132 and/or target application 134. The predefined range may be established by other means known in the art.

The 'to be copied content' represents a larger amount of material to be copied than what is actually intended by the user to be copied from source application 132 to target application 134. The following two examples illustrate 'to be copied content'. Example 1, if an anchor point is located near a business's contact information, the 'to be copied content' encompasses all the businesses contact information located near the anchor point, for instance, the businesses address, the businesses phone number, the facsimile number, hours of operation, etc. Example 2, if no anchor point is established, the predefined range encompasses a quantity of data, which is marked as the 'to be copied content'. It is noted that in step 250, discussed below C&P engine 124 processes the 'to be copied content' through filter 126, thereby removing all the superfluous content and only transfers the required content to target application 134.

In step 240, C&P engine 124 receives the 'to be copied content' via copy-and-paste agent 136A.

In step 250, C&P engine 124 determines the type of content to copy, based on the defined content category of target application 134, via filter 126. Processing the 'to be copied content' is based in part on the predefined category of target application 134. Filter 126 parses the 'to be copied content' in order to determine what content to copy from the 'to be copied content'. The following example illustrates step 250. In an embodiment where the target application is a map program, filter 126 will then search the 'to be copied content' for an address and discards the remainder of the 'to be copied content'. In another embodiment, where the target application is a communication application, such as a telecommunication application, then filter 126 will then searches the 'to be copied content' for a phone number and discards the remainder of the 'to be copied content'.

In step 260, C&P engine 124 sends the copied content to copy-and-paste agent 136B associated with target application 134. In an embodiment, C&P engine 124, through the communication channel, sends the filtered content (from step 250) to copy-and-paste agent 136B, allowing target application 134 to receive the exact content it requires. Target application 134 receives the copied content from copy-and-paste agent 136B which may trigger a predefined action. For example, target application 134 may paste the filtered content into a determined location.

The following example illustrates an embodiment of the disclosed invention. This example, depicts a user wanting to find directions to a specific business. A user is searching for an address on source application 132, such as a web browser. Upon finding the address, the user may click the icon "select copy target" to initiate the dynamic copy and paste operations. Upon selecting the "select copy target" icon, the user is prompted to select a target application 134, such as a map application service. Upon selecting the target application 134, a communication channel is established between the web browser, source application 132, and the map application service, target application 134. Then, 'content to be copied' is marked. Regardless if an anchor point is set by the user, C&P engine 124 through filter 126 sieves through and searches the 'content to be copied' to determine the most suitable information to be copied to target application 134. Finally, the determined most suitable information, such as the business's address, is passed to the map application service, target application 134. The user may then use the map application service to direct user to the searched business.

Figure 3:
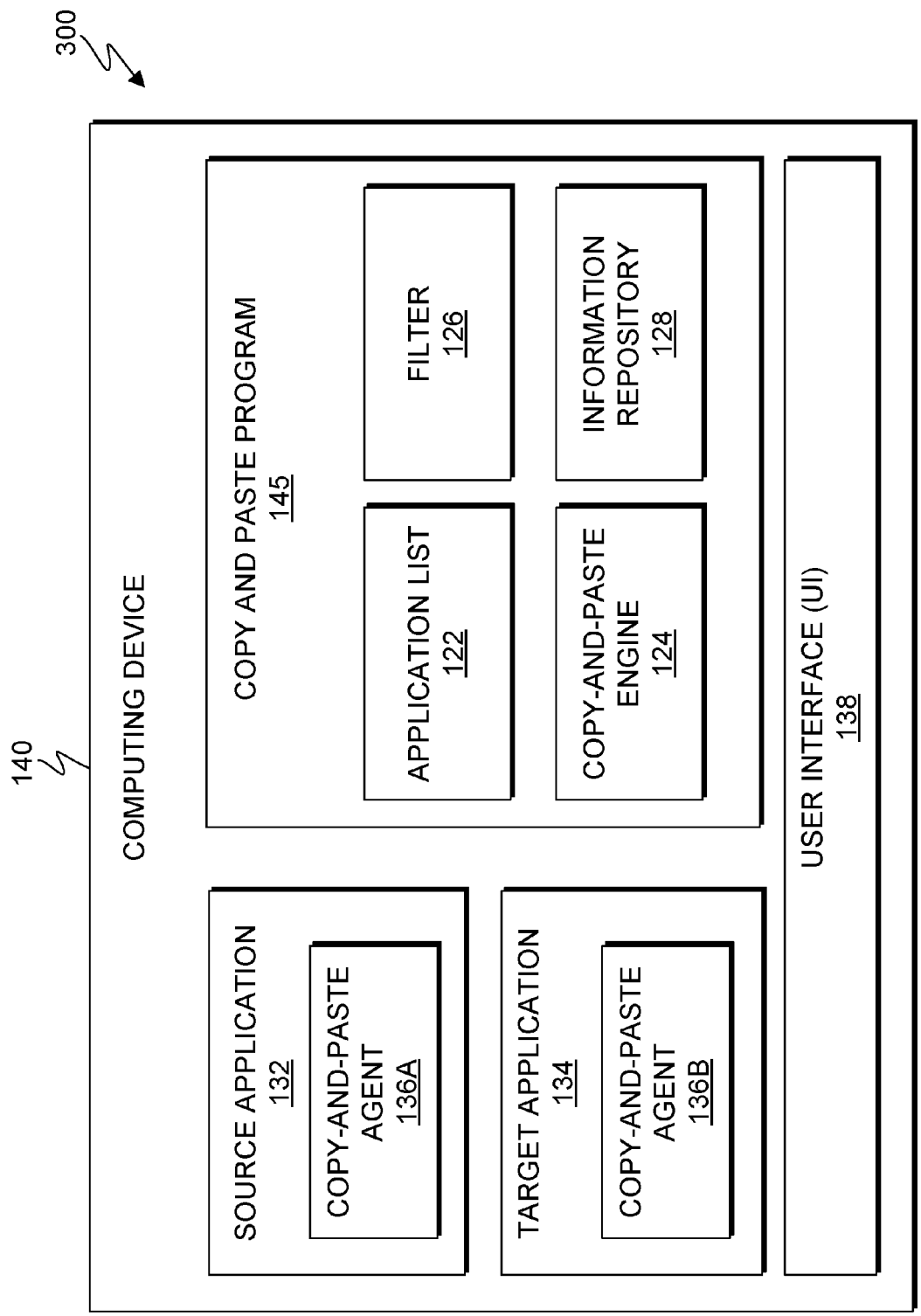
FIG. 3 is a functional block diagram illustrating a data processing environment, in accordance with another embodiment of the present invention.

FIG. 3 is a functional block diagram illustrating a data processing environment, generally designated 300, in accordance with another embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

The exemplary embodiment of data processing environment 300 depicts computing device 140 having various components, it is understood that implementing all of the illustrated components is not a requirement. For example, computing device 140 may include internal and external hardware components, as depicted and described in further detail with respect to FIG. 4. Data processing environment 300 may include additional computing devices, servers or other devices not shown. Data processing environment 300 depicts computing device 140 containing source application 132, target application 134 and copy and paste program 145. Source application 132 contains copy-and-paste agent 136A. Target application 134 contains copy-and-paste agent 136B. Copy and paste program 145 contains application list 122, copy-and-paste engine 124, filter 126, and information repository 128.

Figure 4:
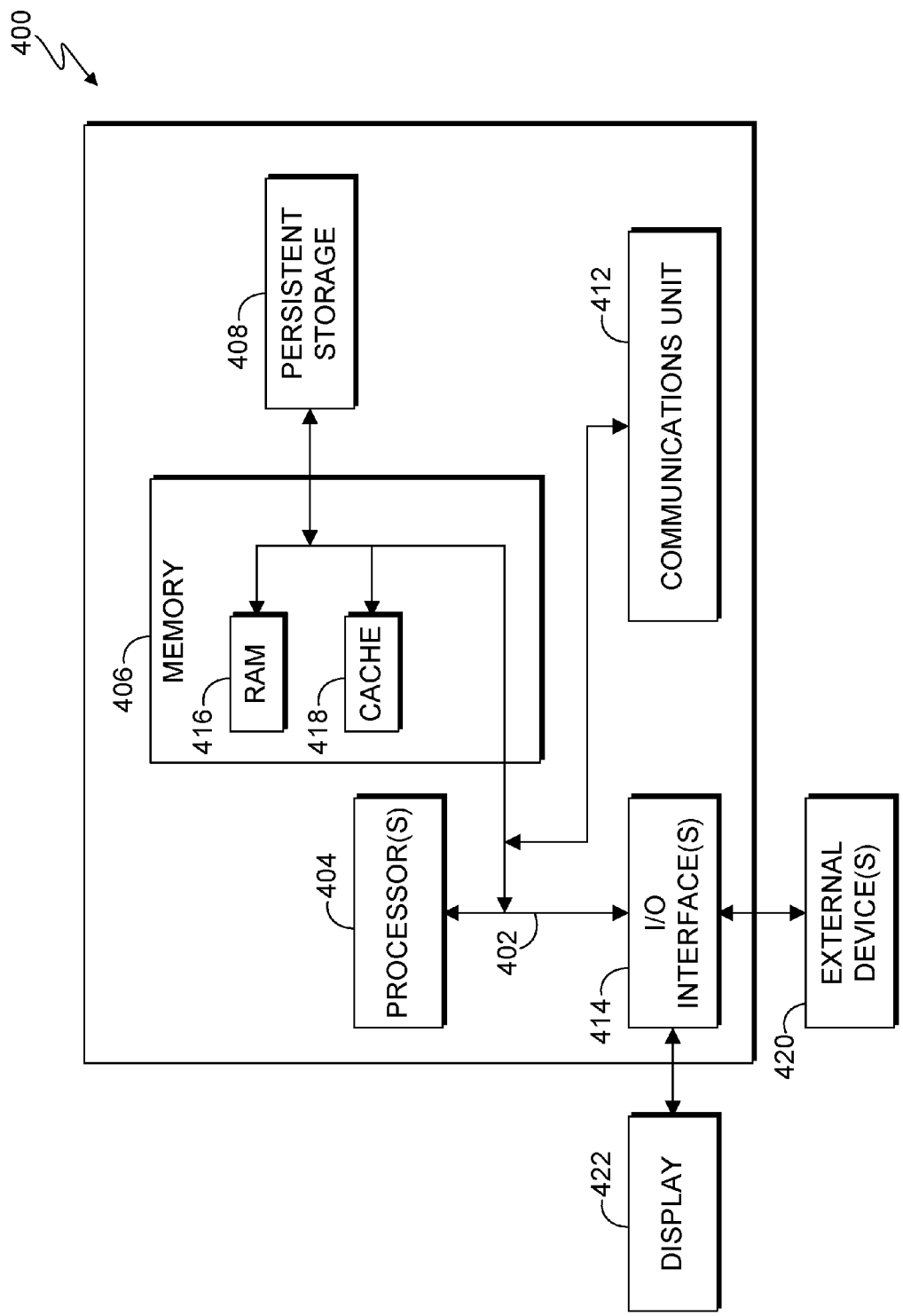
FIG. 4 is a block diagram of the internal and external components of a computer system, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software (e.g., copy-and-paste engine 124) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 412 provides for communications with other computer systems or devices via a network (e.g., network 110). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to server 120 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, on a computing device, a first application, wherein the first application comprises a set of content;
   receiving, by one or more processors, a first indication from a user to copy a subset of content, from the set of content, to a second application, wherein:
      the first indication is based on the user selecting a second application from a set of applications, and
      the second application includes a predefined category;
   establishing, by one or more processors, a communication channel between the first application and the second application;
   identifying, by one or more processors, a predefined range of content comprising the subset of content to copy, based on a second indication from a user, wherein the predefined range is larger than the subset of content to copy;
   determining, by one or more processors, the subset of content to copy from the first application to the second application, based in part on identifying a sequential string of content associated with the predefined category of the second application within the identified predefined range; and
   responsive to determining the subset of content to copy to the second application, displaying, by one or more processors, the determined subset of content on the second application.

2. The method of claim 1, further comprises:
   analyzing, by one or more processors, the subset of content for a specific type of content, wherein the specific type of content is related to the predefined category of the second application.

3. The method of claim 2, wherein the specific type of content comprises at least one of: an address; a name; an object; and a phone number.

4. The method of claim 1, further comprising:
   establishing, by one or more processors, a predefined range of content, from the set of content;
   determining, by one or more processors, a portion of content from the subset of content to copy to the second application based in part on the predefined category of the second application; and responsive to determining the portion of content to copy to the second application, displaying, by one or more processors, the determined portion of content on the second application.

5. The method of claim 1, wherein the first application further comprises an application list, wherein the application list identifies the second application.

6. The method of claim 1, wherein the first application is a web browser comprising an address and a phone number, and wherein the predefined category of the second application is a map, and wherein the determined portion of content to copy is the address.

7. The method of claim 1, wherein the communication channel between the first application and the second application further comprises: bi-directional communication, wherein the bi-directional communication first communicates the subset of content to be copied from the first application, and wherein the bi-directional communication secondly communicates the determined portion of content to be copied, to the second application.

8. The method of claim 1, wherein the predefined range is based on at least one of:
 a distance from the second indication;
 a number of lines of content above and below the second indication; and
 a designated amount of memory space allocated to store content from the second indication.

9. A computer program product comprising:
 a computer readable storage medium and program instructions stored on the computer readable storage medium, the program instructions comprising:
 program instructions to identify on a computing device, a first application, wherein the first application comprises a set of content;
 program instructions to receive a first indication from a user to copy a subset of content from the set of content to a second application wherein
  the first indication is based on the user selecting a second application from a set of applications, and
  the second application includes a predefined category;
 program instructions to establish a communication channel between the first application and the second application;
 program instructions to identify a predefined range of content comprising the subset of content to copy, based on a second indication from a user, wherein the predefined range is larger than the subset of content to copy;
 program instructions to determine the subset of content to copy from the first application to the second application based in part on program instructions to identify a sequential string of content associated with the predefined category of the second application within the identified predefined range; and
 responsive to determining the subset of content to copy to the second application, program instructions to display the determined subset of content on the second application.

10. The computer program product of claim 9, further comprises:
 program instructions to analyze the subset of content for a specific type of content, wherein the specific type of content is related to the predefined category of the second application.

11. The computer program product of claim 10, wherein the specific type of content comprises at least one of: an address; a name; an object; and a phone number.

12. The computer program product of claim 9, further comprising:
 program instructions to establish a predefined range of content, from the set of content;
 program instructions to determine a portion of content from the subset of content to copy to the second application based in part on the predefined category of the second application; and
 responsive to determining the portion of content to copy to the second application, program instructions to display the determined portion of content on the second application.

13. The computer program product of claim 9, wherein the first application further comprises an application list, wherein the application list identifies the second application.

14. The computer program product of claim 9, wherein the first application is a web browser comprising an address and a phone number, and wherein the predefined category of the second application is a map, and wherein the determined portion of content to copy is the address.

15. The computer program product of claim 9, wherein the predefined range is based on at least one of:
 a distance from the second indication;
 a number of lines of content above and below the second indication; and
 a designated amount of memory space allocated to store content from the second indication.

16. A computer system comprising:
 one or more computer processors;
 one or more computer readable storage media;
 program instructions stored on the one or more computer readable storage media for execution by at least one of the one or more processors, the program instructions comprising:
 program instructions to identify on a computing device, a first application, wherein the first application comprises a set of content;
 program instructions to receive a first indication from a user to copy a subset of content from the set of content to a second application wherein
  the first indication is based on the user selecting a second application from a set of applications, and
  the second application includes a predefined category;
 program instructions to establish a communication channel between the first application and the second application;
 program instructions to identify a predefined range of content comprising the subset of content to copy, based on a second indication from a user, wherein the predefined range is larger than the subset of content to copy;
 program instructions to determine the subset of content to copy from the first application to the second application, based in part on program instructions to identify a sequential string of content associated with the predefined category of the second application within the identified predefined range; and
 responsive to determining the subset of content to copy to the second application, program instructions to display the determined subset of content on the second application.

17. The computer system of claim 16, further comprises:
 program instructions to analyze the subset of content for a specific type of content, wherein the specific type of content is related to the predefined category of the second application.

18. The computer system of claim 17, wherein the specific type of content comprises at least one of: an address; a name; an object; and a phone number.

19. The computer system of claim 16, further comprising:
   program instructions to establish a predefined range of content, from the set of content;
   program instructions to determine a portion of content from the subset of content to copy to the second application based in part on the predefined category of the second application; and
   responsive to determining the portion of content to copy to the second application, program instructions to display the determined portion of content on the second application.

20. The computer system of claim 16, wherein the predefined range is based on at least one of:
   a distance from the second indication;
   a number of lines of content above and below the second indication; and
   a designated amount of memory space allocated to store content from the second indication.

* * * * *